United States Patent [19]
Fujie

[11] Patent Number: 5,886,885
[45] Date of Patent: Mar. 23, 1999

[54] DC POWER UNIT AND INFORMATION PROCESSING APPARATUS WITH THE DC POWER UNIT

[75] Inventor: Toshiaki Fujie, Kanagawa-ken, Japan

[73] Assignee: Hitachi, Ltd., Tokyo, Japan

[21] Appl. No.: 766,777

[22] Filed: Dec. 13, 1996

[30] Foreign Application Priority Data

Dec. 15, 1995 [JP] Japan ................................. 7-327389

[51] Int. Cl.$^6$ .......................... H02M 1/12; H02M 3/18; G05F 1/10
[52] U.S. Cl. ................... 363/49; 363/89; 363/59; 323/222
[58] Field of Search ............... 363/49, 59, 89, 363/124; 323/222

[56] References Cited

U.S. PATENT DOCUMENTS

| | | | |
|---|---|---|---|
| 4,980,811 | 12/1990 | Suzuji et al. | 363/21 |
| 5,258,901 | 11/1993 | Fraidlin | 363/89 |
| 5,301,095 | 4/1994 | Teramoto et al. | 363/89 |
| 5,436,550 | 7/1995 | Arakawa | 323/222 |
| 5,457,622 | 10/1995 | Arakawa | 363/49 |

OTHER PUBLICATIONS

"Electronic Technology", Mar. 1995, vol. 37, No. 3, 1995, pp. 36–41 & pp. 96–97.

Primary Examiner—Peter S. Wong
Assistant Examiner—Rajnikant B. Patel
Attorney, Agent, or Firm—Antonelli, Terry, Stout & Kraus, LLP

[57] ABSTRACT

In order to prevent malfunction resulting from the variation of the output of a boosting converter in a boosting two-converter type dc power unit, a dc power unit includes a boosting converter composed of a control circuit and a rectifying diode connected to an ac input through a switch and an insulating dc-to-dc converter connected at a later stage of the boosting converter. Between the boosting converter and the insulating dc-to-dc converter, there is provided a first control circuit composed of a shunt regulator, a voltage dividing resistor for producing a control voltage for the shunt regulator, a photocoupler to be turned on and off by the shunt regulator, and a resistor. When the dc output voltage Vo of the boosting converter reaches a predetermined value, the photocoupler is enabled to handle a REMOTE_ON/OFF signal through a remote control terminal for starting the insulating dc-to-dc converter.

19 Claims, 10 Drawing Sheets

DC POWER UNIT AND INFORMATION PROCESSING APPARATUS WITH THE DC POWER UNIT

BACKGROUND OF THE INVENTION

The present invention relates to a dc power unit which is suitable to an information processing apparatus such as a connecting unit between LANs, and more particularly to a technique which may be effectively applied to the dc power unit for coping with regulations for harmonics through the effect of a boosting two-converter system.

In order to take measures for regulations for harmonics required by a dc power unit used for an information processing apparatus such as a connecting unit between LANs, as a technique for suppressing harmonics of a power unit, there have been proposed a choke input rectifying type, a current injecting type, a one-converter type based on a Mag-Switch type, and a boosting two-converter type. These prior arts have been published in the writing: "Electronic Technology", March 1995 (Vol. 37, No. 3, 1995), pages 36 to 41 and 96 to 97. These techniques have their own merits and demerits. Of them, today, the most remarkable and the most frequently realized technique is the boosting two-converter type.

With reference to FIG. 8, the circuit of the boosting two-converter type dc power unit will be described below. FIG. 8 illustrates a switching transistor 5, a control circuit 17 located around the switching transistor 5, and an insulating dc-to-dc converter 8 located at a later stage. The control circuit 17 receives an input voltage waveform applied thereto as a reference current Iref. At first, the reference current Iref is compared with a drain current Id sensed by a resistor 6. If the drain current Id exceeds the reference current Iref, a comparator 12 produces an inverted output and serves to turn off the switching transistor 5. As shown in FIG. 10, therefore, the drain current flows on a reference input voltage.

This current Id gives rise to energy in a coil 3. When the switching transistor 5 is turned off, at a time, counter electromotive force is generated in the coil 3, so that the coil 3 is served to invert its polarity and discharge the energy stored therein to a capacitor 7 through a diode 4. The capacitor 7 operates to smoothen the energy current into dc current. The rise of pulsating current results in boosting the reference current Iref and thereby enlarging the drain current Id (see FIG. 10). This inverts the comparator 12 so that the amount of energy stored in the coil 3 and conveyed from the coil 3 to the output is made larger accordingly.

The repetition of the foregoing operation yields a dc electric power at the output. If the pulsating current is applied onto the input side, since a maximum value of current at each period is on a sine curve, the smoothed pulsating current is made to be a sine waveform that is equal to an input voltage waveform. It means that, in principle, a power factor of 1 can be obtained. Hence, no power harmonics are generated. Practically, a power factor of 0.9 or higher can be easily obtained. If well-designed and adjusted, it is possible to realize a power factor of 0.99.

Apart from the capacitor input rectifying type, no smoothing capacitor is connected immediately after the rectifier. No pulsating current is flown through the input line. This results in being able to produce a high power factor and suppressing harmonics of a power unit.

The aforementioned arrangement makes it possible to produce a stabilized output. By changing the reference current value Iref, the conducting period of the switching transistor 5 may be changed. It indicates the output voltage may be controlled.

That is, if some factor lowers the output voltage, an error amplifier 10 operates to increase the reference current Iref. This operation makes it possible to extend the ON time of the switching transistor 5 at each period, raise the Id value and thereby the output voltage.

The voltage precision of the dc output voltage Vo is determined by the reference voltage Vref and the gain of the error amplifier 10. Hence, the combination of the control circuit 17 with an insulating dc-to-dc converter 8 results in suppressing the harmonics and constructing a wide-range continuous variable output power unit ranging from 90 to 264 ac volts of a power input.

However, if the conventional boosting two-converter type power unit is powered up when the low power is applied to the input (the 100-volt system power from 90 to 120 ac volts is input), the power output Vo1 is overshot, so that an excessive voltage sensed by the protecting circuit may turn off the dc power unit.

This phenomenon will be described with reference to FIGS. 8 and 9. When the input switch 16 is turned on, the ac input is applied to the rectifying diode 2. Then, the rectifying diode 2 operates to output a full-wave rectified voltage (127 to 180 dc volts) to a point Vo.

When the boosting converter is softly started (an on/off pulse width of the switching transistor 5 is gradually changed), as shown by a waveform of Vo shown in FIG. 9, Vo is boosted to the set voltage in one stroke.

The set voltage Vo is set to be a higher voltage than the rectified voltage (360 dc volts) of 240 V+6%=25.44 ac volts that is high at the ac input 1. In general, it is about 380 dc volts.

Hence, the abruptly changing voltage shown by Vo of FIG. 9 is applied to the insulating dc-to-dc converter 8. The dc-to-dc converter operating at 380 dc volts normally departs from the control range if the input voltage ranges from 127 to 180 dc volts and disables to output a rated voltage (for example, +5 volts). The converter in this state is operating in the state that the control pulse (for example, +2 to +3 volts) is opened to a maximum limit. At this time, the abrupt rise of Vo delays a transient response of a feed-back system, thereby causing the overshoot phenomenon in the power unit Vo1. In the worst case, the power output Vo1 may be sensed as an excessive voltage by the protecting circuit. This may result in turning off the operation of the converter.

SUMMARY OF THE INVENTION

It is an object of the present invention to provide a dc power unit composed of a first and a second converters which unit operates to prevent erroneous operation of the second converter resulting from the variation of the output voltage sent from the first to the second converter and thereby improve the reliability of the operation.

It is a further object of the present invention to provide a dc power unit technique which enables to realize a wide-range continuous variable output power unit as keeping the most appropriate function of suppressing the harmonics through the combination of the first and the second converters.

It is a yet further object of the present invention to provide an information processing apparatus which enables to prevent erroneous operation as keeping the state of the suppressing the harmonics.

In carrying out these objects, according to the present invention, a dc power unit including a first converter for converting an ac electric power into a dc electric power and a second converter for receiving an output of the first converter as an input and for converting the dc electric power into another dc power, provides a first control circuit for starting the second converter later than the start of the first converter by a predetermined time.

The first control circuit operates to sense a dc output voltage level of the first converter and starts the second converter when the dc output voltage level reaches a predetermined level.

The first control circuit operates to sense the dc output voltage level of the first converter and connect the first converter to the second converter when the dc output voltage level reaches a predetermined level.

Further, an information processing apparatus is arranged to have a first converter for converting an ac electric power into a dc electric power, a second converter for receiving the output of the first converter as an input and converting the dc voltage into another dc voltage, a first control circuit for starting the second converter later than the start of the first converter by a predetermined time, a platter connected to the power unit of the second converter, and a logic board provided with logic LSI chips mounted thereon having a driving power as a voltage output from the second converter.

DESCRIPTION OF THE PREFERRED EMBODIMENTS

Later, the description will be oriented to the embodiments of the present invention with reference to the drawings.

Embodiment 1

Figure 1:
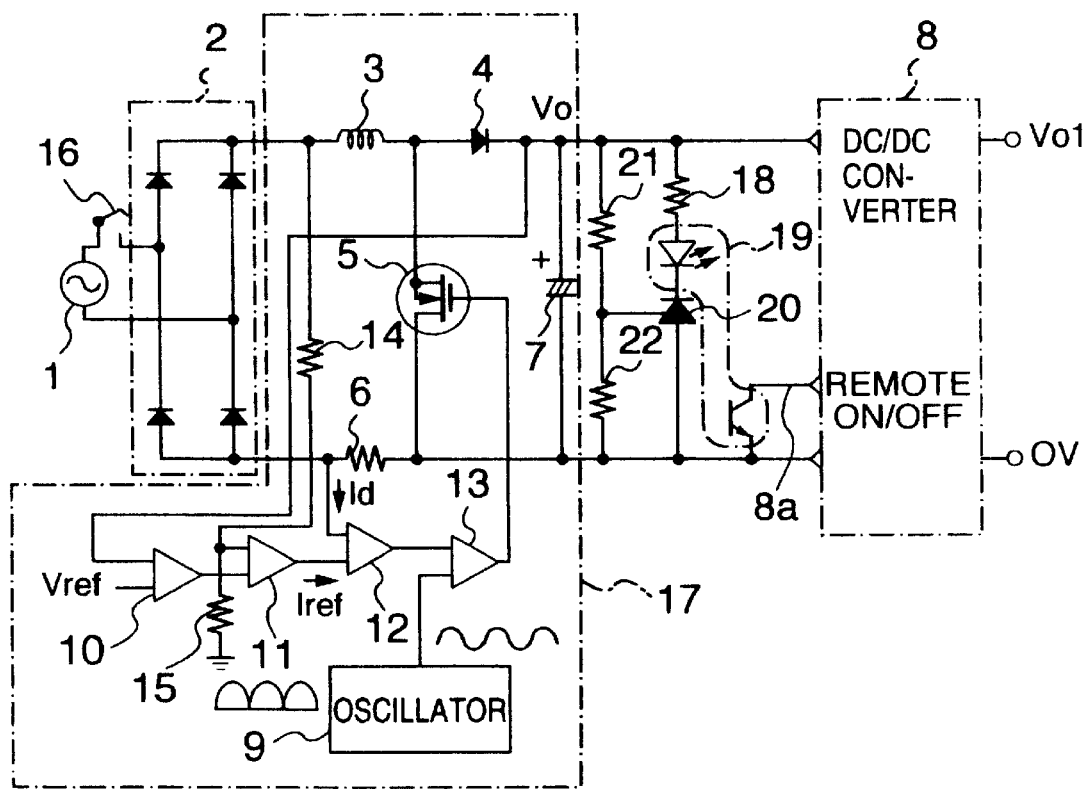
FIG. 1 is a circuit diagram showing an arrangement of a dc power unit according to a first embodiment of the present invention.
Figure 2:
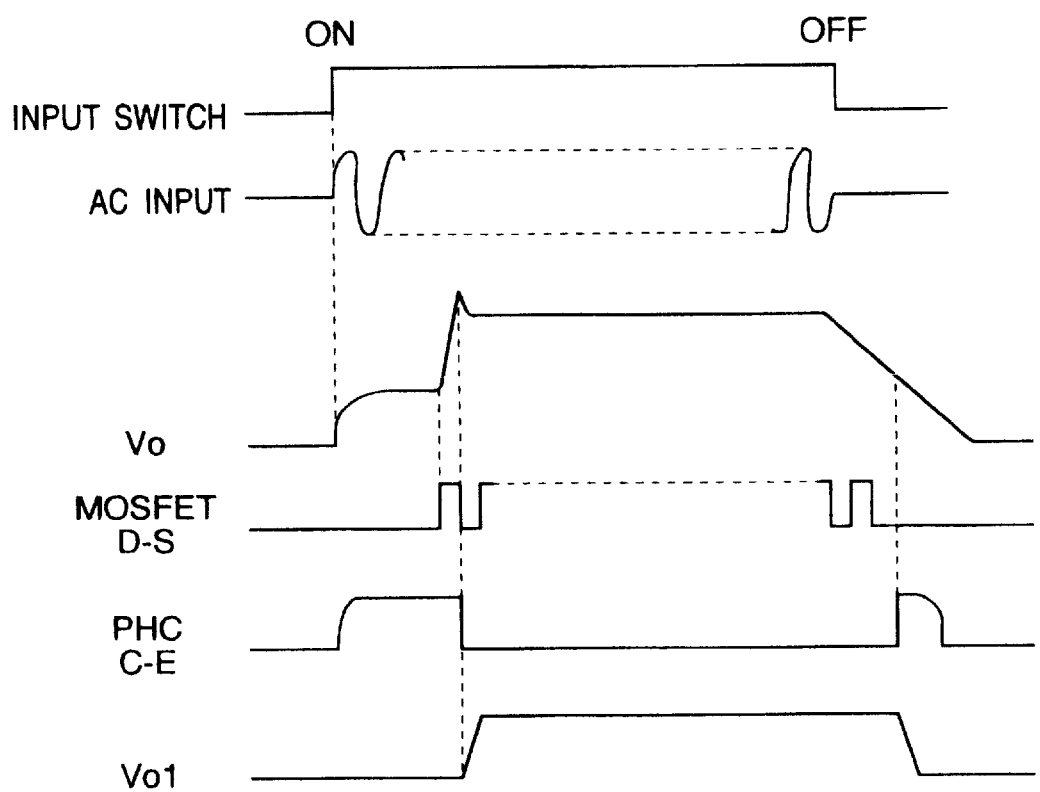
FIG. 2 is a chart showing a function example of the dc power unit shown in FIG. 1.

FIG. 1 is a circuit diagram showing an arrangement of a dc power unit according to a first embodiment of the present invention. FIG. 2 is a chart showing a functional example of the dc power unit shown in FIG. 1.

The dc power unit shown in FIG. 1 includes a rectifying diode 2 connected to an ac input 1 through an input switch 16, a boosting converter having a switching transistor 5 composed of a power MOSFET and the like and a control circuit for the switching transistor 17, and an insulating dc-to-dc converter 8 connected at the later stage of the boosting converter.

In the control circuit 17, a numeral 3 denotes a coil. A numeral 4 denotes a diode. A numeral 7 denotes a capacitor for smoothing the output. A numeral 10 or 11 denotes an error amplifier. A numeral 12 or 13 denotes a comparator. A numeral 6, 14 or 15 denotes a resistor. A numeral 9 denotes an oscillator for generating a driving signal of the switching transistor 5.

In this case, between the control circuit 17 and the insulating dc-to-dc converter 8, both of which compose the boosting converter, there is provided a first control circuit composed of voltage dividing resistors 21 and 22 for obtaining a control voltage of a shunt regulator 20 from a dc output voltage Vo of the boosting converter, a photocoupler 19 to be turned on and off by the shunt regulator 20, and a resistor 18. The photocoupler 19 is connected to a remote control terminal 8a of the insulating dc-to-dc converter 8. By applying a REMOTE_ON/OFF signal through the terminal 8a, the insulating dc-to-dc converter is started or stopped.

Later, the description will be oriented to the functional example of the dc power unit according to the embodiment of the invention.

Figure 10:
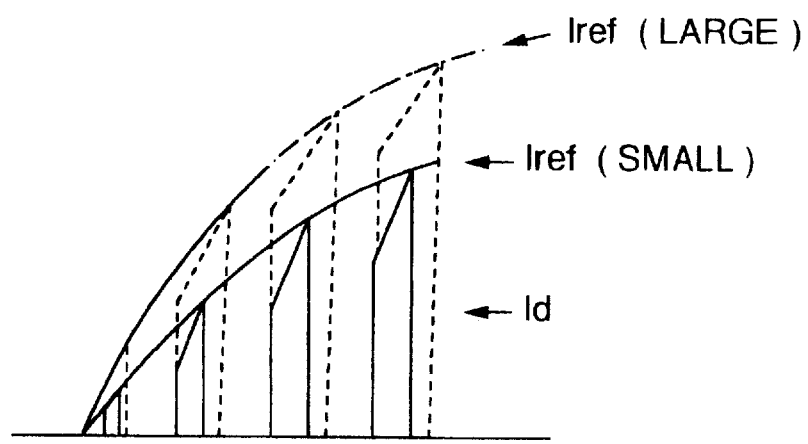
FIG. 10 is a chart showing another functional example of the conventional dc power unit shown in FIG. 8.

When the ac input 1 is applied to the rectifying diode 2 by turning on the input switch 16, the rectifying diode 2 produces a full-wave rectified voltage and outputs it. At the 100-volts system input ranging from 90 to 127 ac volts, the dc output voltage Vo output from the boosting converter ranges from 127 to 180 dc volts. Next, when the boosting converter is softly started, the voltage waveform is applied as a reference current Iref to the input. This reference current Iref is compared with a drain current Id of the switching transistor 5 sensed by the resistor 6. When the drain current Id exceeds the reference current Iref, the comparator 12 operates to feed an inverted output so that the switching transistor 5 is turned off. The turn-off of the transistor 5 allows the drain current Id to flow on the reference input voltage as shown in FIG. 10. This current is stored as energy in the coil 3. When the switching transistor 5 is turned off, at a time, counter electromotive force is generated in the coil, so that the polarity of the coil 3 is inverted. Hence, the electric power stored as energy in the coil 3 is discharged to the output through the diode 4. The electric power is smoothened into direct current by the capacitor 7.

The rise of the pulsating voltage of the ac input 1 leads to raising the reference current Iref. As shown in FIG. 10, the drain current Id is made larger, so that the comparator 12 feeds the inverted output. Hence, the amount of the energy stored in the coil and conveyed to the output terminal is made larger accordingly.

The repetition of the foregoing operation results in producing a dc electric power at the output terminal. If the current on the input side is pulse-wise, since the maximum value of the current at each period is on a sine curve, the averaged current is finally smoothened into a sine waveform that is equal to the input voltage waveform. It means that, in principle, a power factor of 1 can produced, thereby suppressing the harmonics of the power unit. When the boosting converter is softly started, Vo is boosted up to a set voltage (380 dc volts) as illustrated in FIG. 2 at a stroke.

According to this embodiment, the first control circuit operates to prevent the photocoupler 19 from turned on and stop the insulating dc-to-dc converter 8 located at the later stage until the dc output voltage Vo reaches a voltage value set by the voltage dividing resistors 21 and 22 provided outside of the shunt regulator 20.

And, after the dc output voltage Vo is made sufficiently high, the photocoupler 19 is turned on. Then, the insulating dc-to-dc converter 8 located at the later stage is started by applying an on signal to a remote control terminal 8a provided in a REMOTE_ON/OFF signal circuit (not shown), so that the insulating dc-to-dc converter 8 operates to feed a power output Vo1 to an external load. As described above, according to this embodiment, the first control circuit is served to inhibit the start of the insulating dc-to-dc converter 8 located at the later stage until the dc output voltage Vo of the boosting converter 8 reaches a predetermined value. Hence, the abrupt change of the dc output voltage Vo of the boosting converter does not influence the insulating dc-to-dc converter 8. Though the voltage Vo is abruptly changed, the converter is properly enabled as shown in the waveform of the power output Vo1 of FIG. 2.

That is, if the dc output voltage Vo is abruptly changed, no shortcoming such as overshoot of the power output Vo1 takes place in the insulating dc-to-dc converter 8 located at the later stage. The overshoot of the power output Vo1, for example, enables the protecting circuit to sense an excessive voltage, thereby preventing an erroneous operation such as arbitrary turn-off of the insulating dc-to-dc converter 8.

Compared with the embodiments 2 and 3 to be described later, the dc power unit of this embodiment is wholly composed of semiconductors and resistors. It means that the circuit may be made compact. Further, the photocoupler is operated to electrically turn on and off the circuit. This photocoupler-based switching offer more precise control than an electromagnetic switch realized by a coil. Moreover, the system of the voltage division done by a resistor and the shunt regulator lends itself to realizing more highly accurate control than a Zener diode.

In other words, without causing an erroneous operation of the insulating dc-to-dc converter 8 resulting from the voltage variation in the boosting converter, the combination of the boosting converter and the insulating dc-to-dc converter 8 makes it possible to realize a wide-range continuous variable output power unit as keeping the optimal effect of suppressing the harmonics.

Embodiment 2

Figure 3:
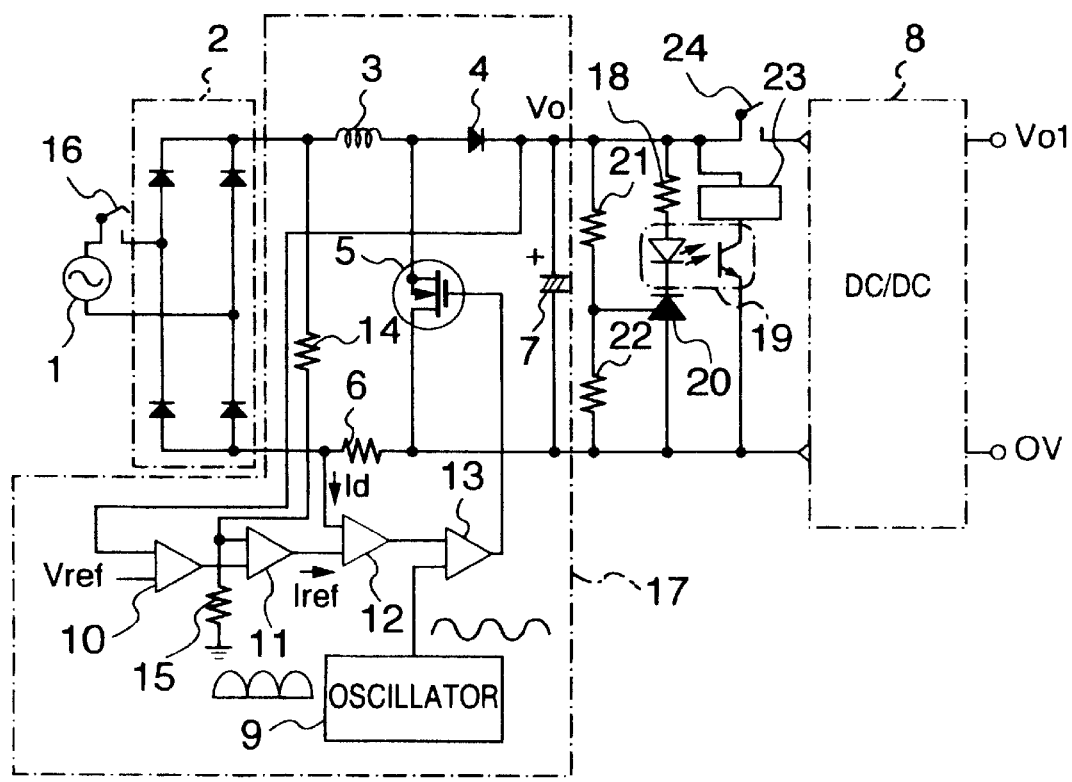
FIG. 3 is a circuit diagram showing an arrangement of a dc power unit according to a second embodiment of the present invention.

FIG. 3 is a circuit diagram showing an arrangement of a dc power unit according to a second embodiment of the present invention. The dc power unit according to the foregoing first embodiment uses the REMOTE_ON/OFF signal to be applied to the remote control terminal 8a for controlling the insulating dc-to-dc converter 8 located at the later stage. The dc power unit according to the second embodiment is arranged to directly control the connection between the boosting converter and the insulating dc-to-dc converter 8. This arrangement will be described below.

In the second embodiment, a connecting path between the boosting converter and the insulating dc-to-dc converter 8 provides a second control circuit on the path itself. The second control circuit is composed of a photocoupler 19, a relay contact 24 to be controlled to be opened or shut by a relay coil 23, a shunt regulator 20 for controlling the photocoupler 19 on and off, voltage dividing resistors 21, 22, a resistor 18 and the like.

Then, when the shunt regulator 20 and the voltage dividing resistors 21 and 22 push the dc output voltage Vo upper than a predetermined voltage, the photocoupler 19 is served to pass current through the relay coil 23 and thereby close the relay contact 24, so that the dc output voltage Vo of the boosting converter is applied to the insulating dc-to-dc converter 8 located at the later stage. The application of the voltage Vo enables the converter 8 to feed the power output Vo1. Like the foregoing first embodiment, this arrangement makes it possible for the insulating dc-to-dc converter 8 to inhibit occurrence of short-comings such as overshoot of the power output Vo1 resulting from the abrupt change of the dc output voltage Vo.

The dc power unit of this embodiment is arranged to directly control the connection between the boosting converter located at the first stage and the insulating dc-to-dc converter 8 located at the later stage. Hence, unlike the first embodiment, the insulating dc-to-dc converter 8 is not required to provide the remote control terminal 8a, the REMOTE_ON/OFF signal circuit and the like. It may be applied to many kinds of insulating dc-to-dc converters 8 each having its own specification. This enhances the availability. In addition, the dc power unit of this embodiment needs less parts than that of the first embodiment.

Embodiment 3

Figure 4:
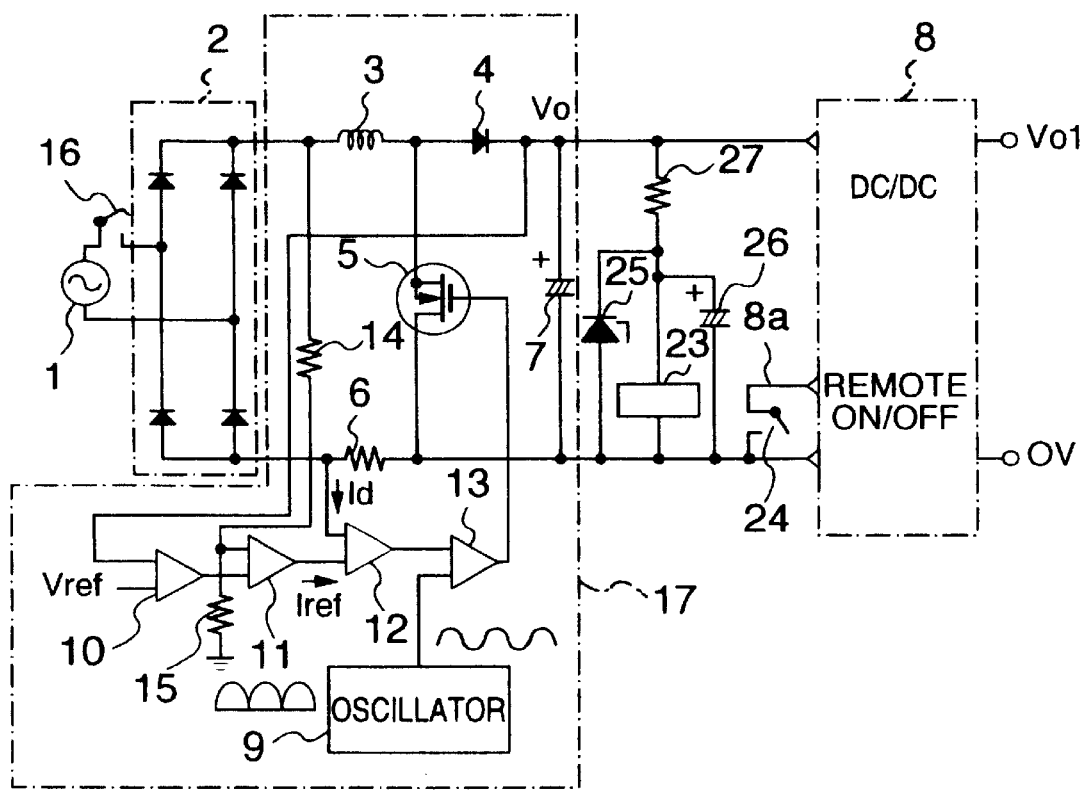
FIG. 4 is a circuit diagram showing an arrangement of a dc power unit according to a third embodiment of the present invention.

FIG. 4 is a circuit diagram showing an arrangement of a dc power unit according to the third embodiment of the present invention. In the foregoing first embodiment, the dc output voltage Vo is sensed on the predetermined voltage value set by the shunt regulator 20 and the voltage dividing resistors 21 and 22 located outside and the dc power unit of the third embodiment is meanwhile arranged to provide on an output path of the dc output voltage Vo a delaying circuit (third control circuit) composed of a capacitor 26, a resistor 27, a relay coil 23, a relay contact 24, a Zener diode 25 and the like.

The dc output voltage Vo is caused to drop to a slow acting voltage of the relay coil 23 by the resistor 27 before it is applied. The phase delay caused by the resistor of the relay coil 23 itself and the capacitor 26 causes a delay time between when the dc output voltage Vo reaches the predetermined value and when the voltage Vo reaches the slow acting voltage of the relay coil 23.

That is, after the boosting converter is softly started so that the dc output voltage Vo is boosted to a set voltage (380 dc volts) in one stroke, the relay contact 24 is closed a given time later. The insulating dc-to-dc converter 8 located at the later stage is started to feed the power output Vo1 by applying as a REMOTE_ON/OFF signal an on signal to the remote control terminal 8a.

Like the foregoing first embodiment, this arrangement makes it possible to inhibit the adverse effect of the abrupt change of the dc output voltage Vo on the insulating dc-to-dc converter 8.

Embodiment 4

Figure 5:
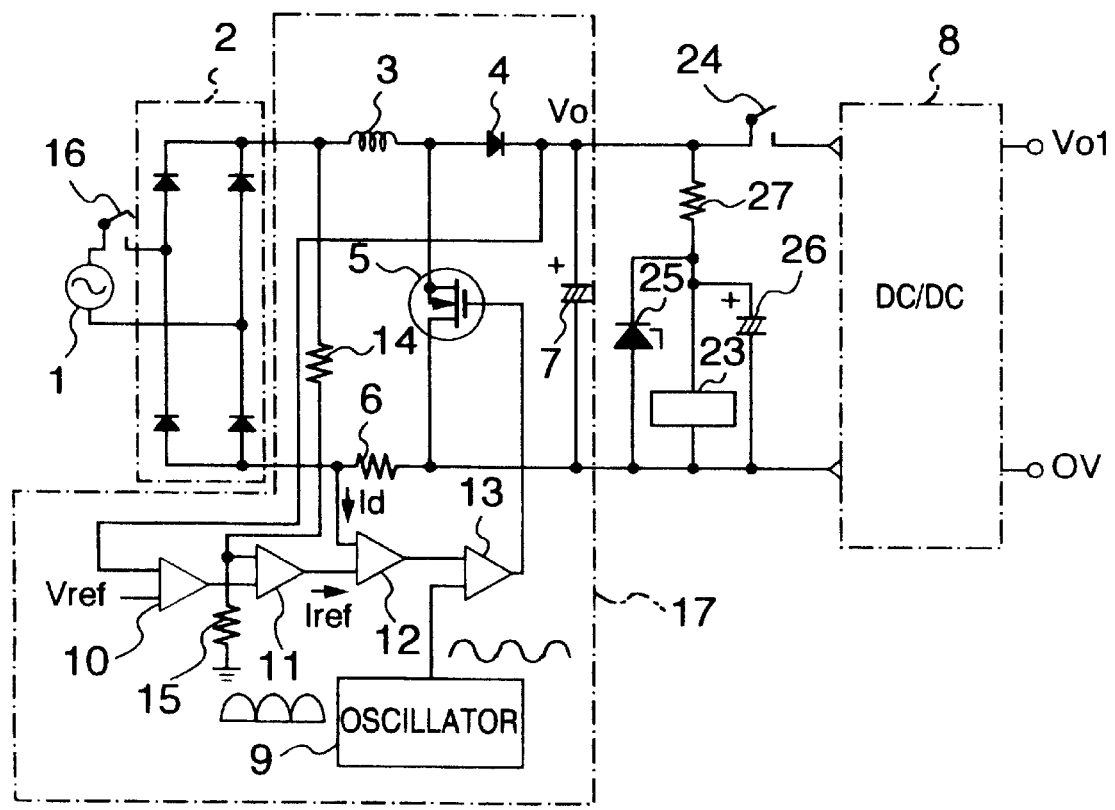
FIG. 5 is a circuit diagram showing an arrangement of a dc power unit according to a fourth embodiment of the present invention.

FIG. 5 is a circuit diagram showing an arrangement of a dc power unit according to the fourth embodiment of the present invention. The dc power unit of the foregoing third embodiment is arranged to turn on and off the insulating dc-to-dc converter 8 located at the later stage with the REMOTE_ON/OFF signal applied onto the remote control terminal 8a. On the other hand, the dc power unit of the fourth embodiment is arranged to provide a fourth control circuit for directly controlling the connection between the boosting converter and the insulating dc-to-dc converter 8 located at the later stage. That is, by closing this relay contact 24, the boosting converter is connected to the insulating dc-to-dc converter 8 located at the later stage so that the dc output voltage Vo may be applied to the converter 8. In response, the converter 8 operates to feed the power output Vo1 to an external load (not shown).

Like the first embodiment, this arrangement makes it possible to inhibit the adverse effect of the abrupt change of the dc output voltage Vo on the insulating dc-to-dc converter 8 located at the later stage.

The dc power unit of the fourth embodiment operates to directly control the connection between the boosting converter located at the first stage and the insulating dc-to-dc converter located at the later stage. Hence, the insulating dc-to-dc converter 8 does not need to provide the remote control terminal 8a, the REMOTE_ON/OFF signal circuit, and the like and is generally applicable to many kinds of insulating dc-to-dc converter 8 each having its own specification. In addition, the converter 8 needs less parts than the prior art.

Embodiment 5

Figure 6:
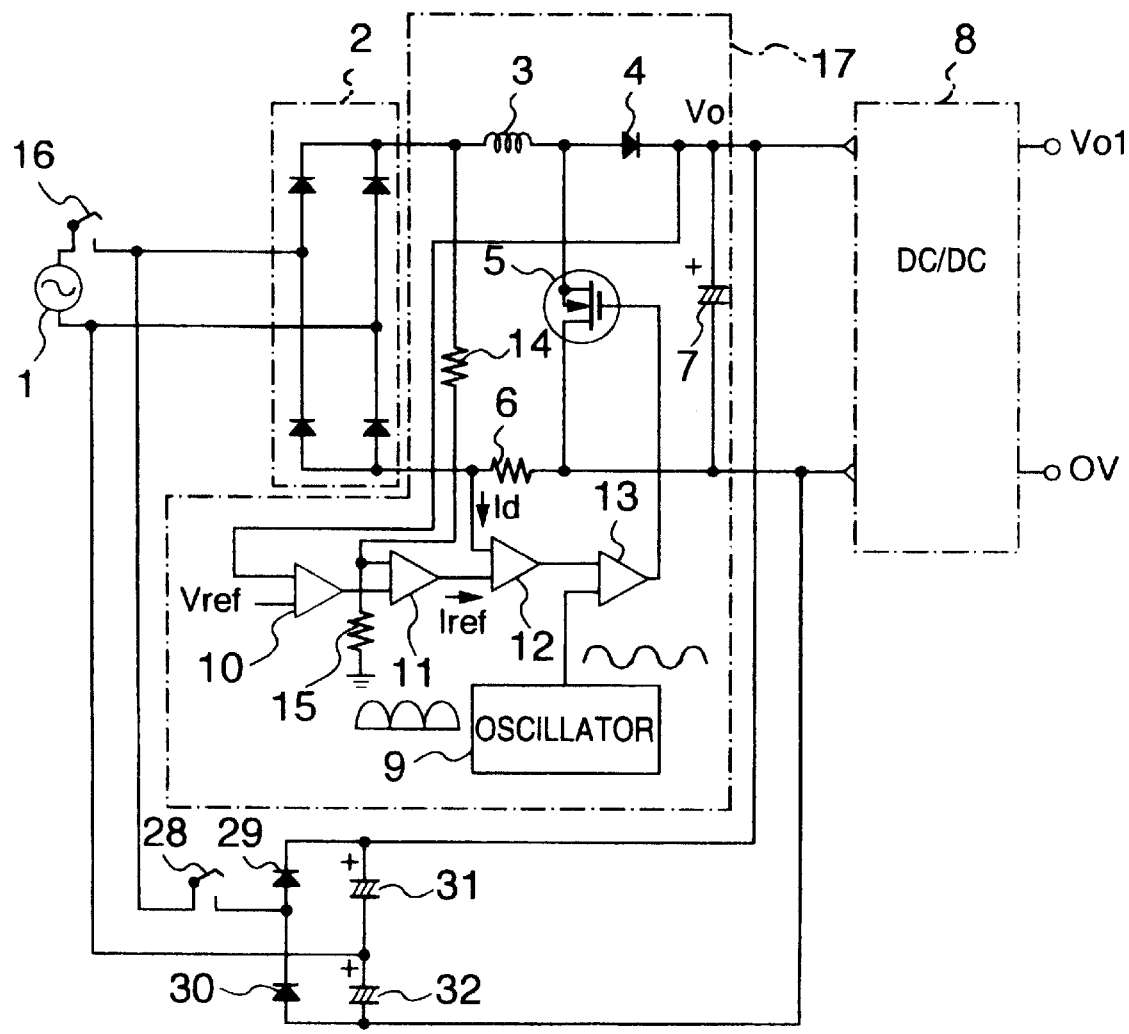
FIG. 6 is a circuit diagram showing an arrangement of a dc power unit according to a fifth embodiment of the present invention.
Figure 7:
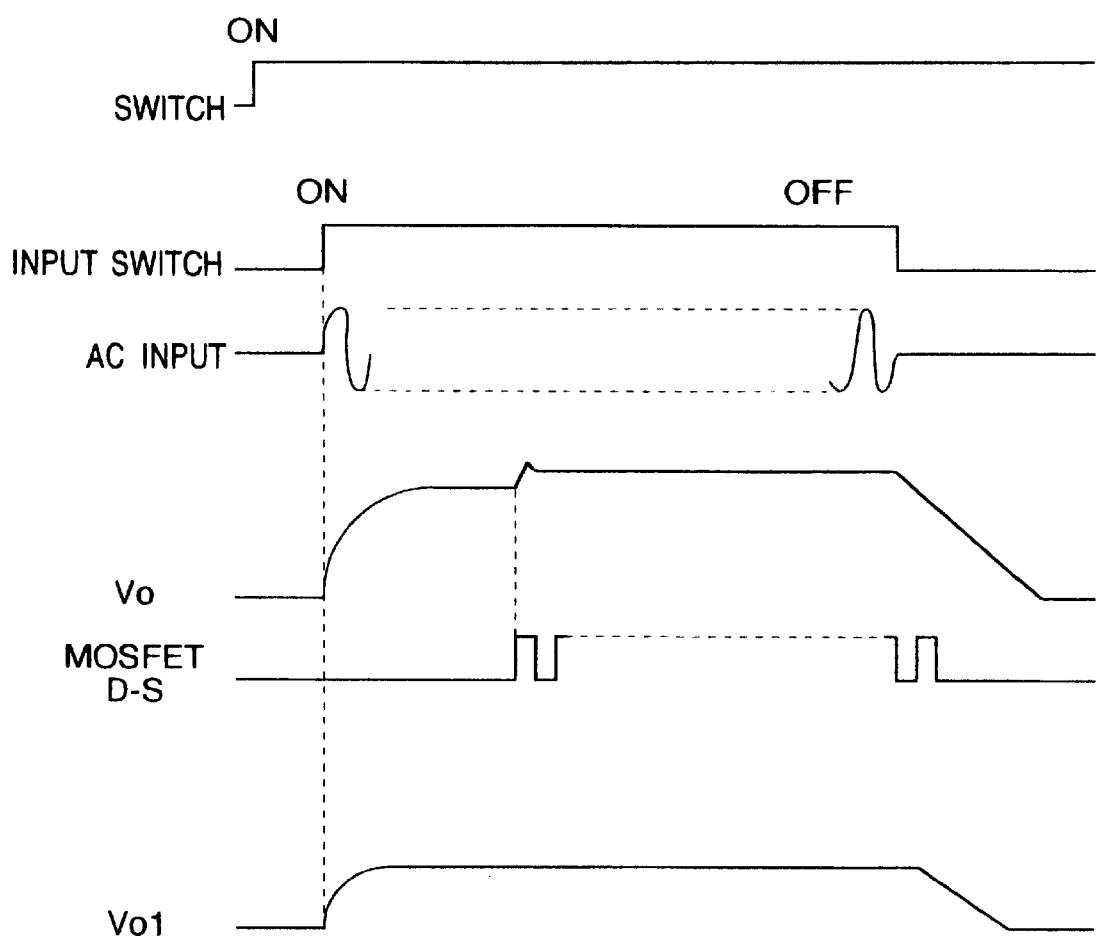
FIG. 7 is a chart showing a functional example of the dc power unit shown in FIG. 6.
Figure 8:
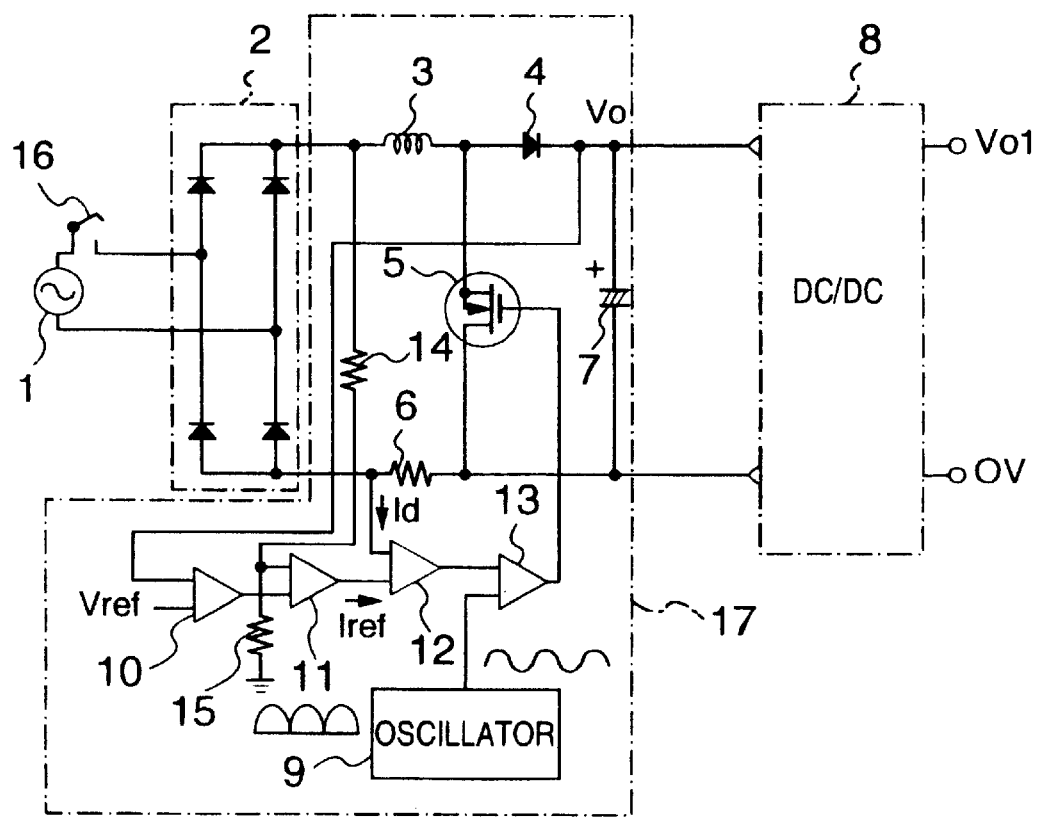
FIG. 8 is a circuit diagram showing the conventional boosting two-converter type dc power unit.
Figure 9:
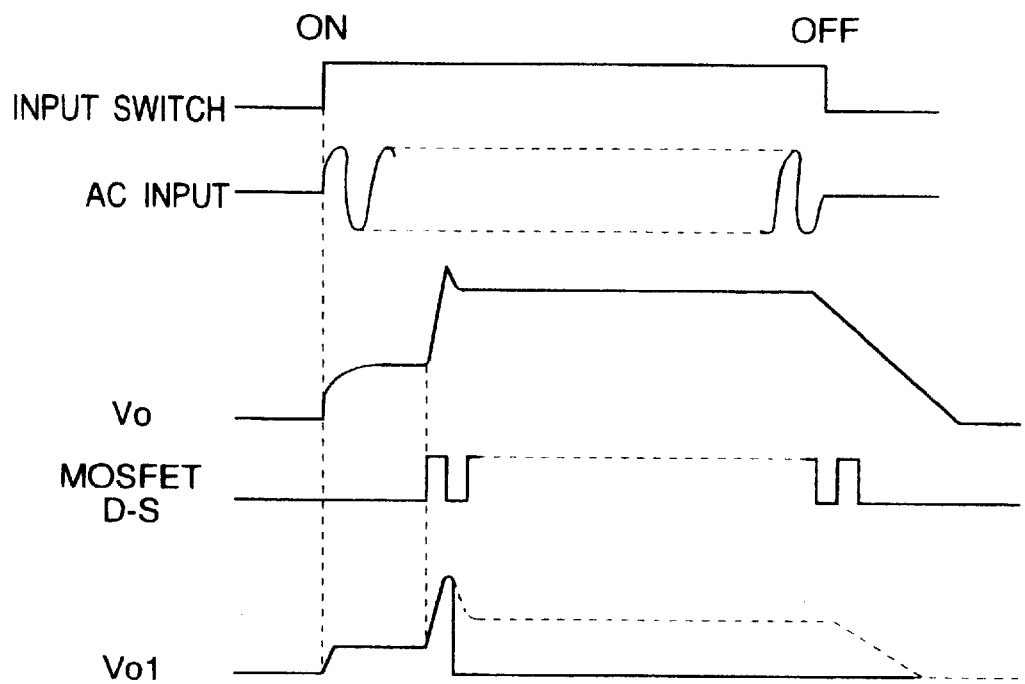
FIG. 9 is a chart showing a functional example of the conventional dc power unit shown in FIG. 8.

FIG. 6 is a circuit diagram showing an arrangement of a dc power unit according to a fifth embodiment of the present invention. FIG. 7 is a chart showing the functional example of the dc power unit. The dc power unit of the fifth embodiment is arranged to connect a voltage doubler rectifying circuit to an ac input 1 in parallel to a boosting converter through a switch 28. The voltage doubler rectifying circuit is composed of diodes 29, 30 and capacitors 31, 32.

When applying a 100 volts system input ranging from 90 to 127 ac volts, at first, the switch 28 is closed. Then, as soon as the input switch 16 is closed, the doubled and rectified voltage (254 to 360 dc volts) is directly output as the dc output voltage Vo so that the voltage is applied up to the control range of the insulating dc-to-dc converter 8 located at the later stage in one stroke. In this application, the operating sequence of the switch 28 and the input switch 16 and the changes of the dc output voltage Vo and the power output Vo1 are shown in FIG. 7.

Hence, when the boosting converter is softly started, the input abrupt change value is very small if the dc output voltage Vo is boosted to the set voltage (380 dc volts). Further, since the insulating dc-to-dc converter 8 does not keep the control pulse opened to a maximum limit, no overshoot phenomenon takes place in the power output Vo1.

As set forth above, according to the foregoing embodiment of the present invention, when the boosting converter at the first stage is in operation, if the dc output voltage Vo is abruptly changed, the abrupt change does not have an adverse effect on the insulating dc-to-dc converter 8 located at the later stage. Hence, the resulting power unit is a wide-range continuous variable output power unit ranging from 90 to 264 ac volts of the power input as keeping the optimal effect of suppressing the harmonics.

Figure 11:
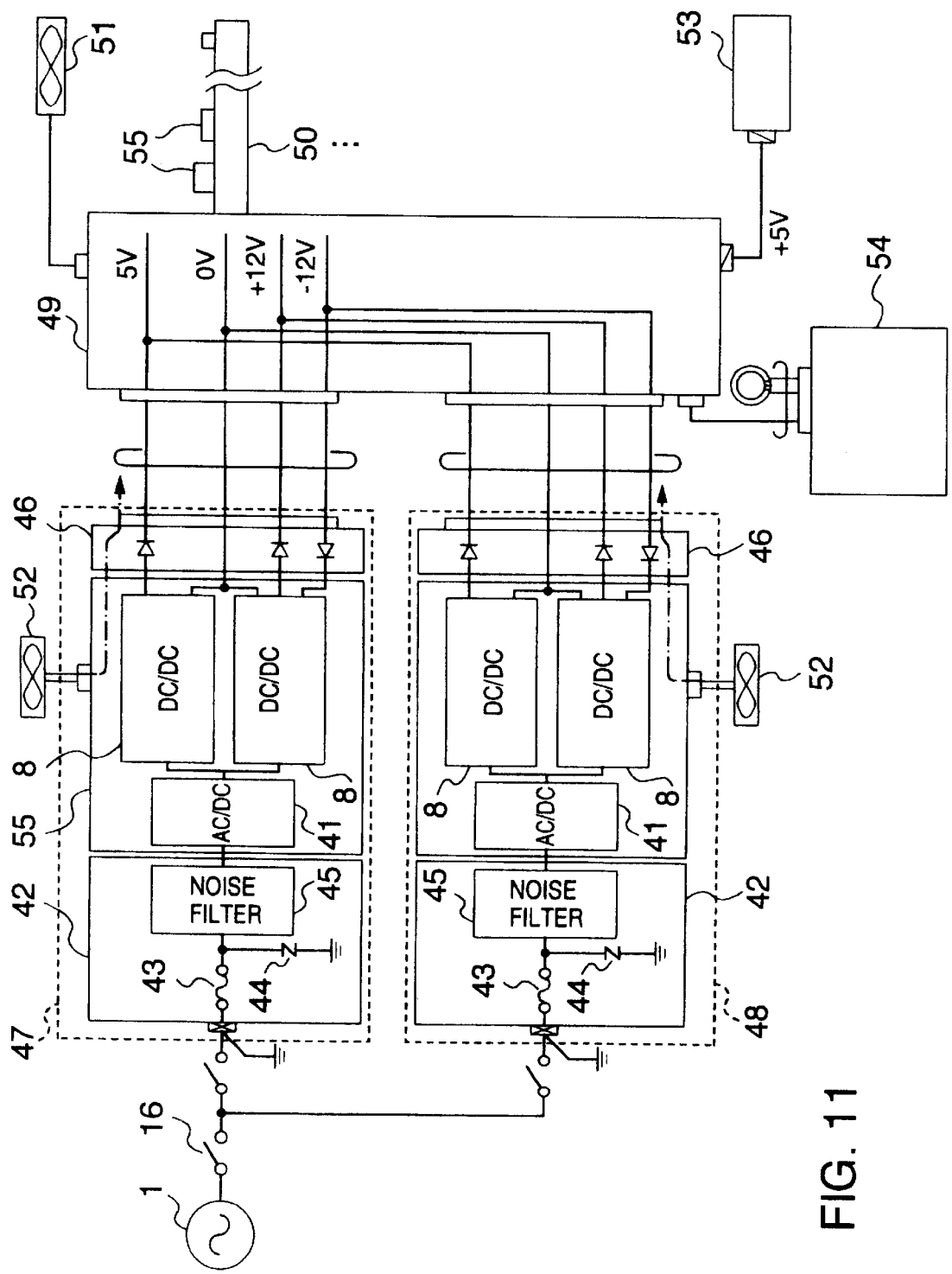
FIG. 11 is a circuit diagram showing a connecting unit between LANs to which the present invention applies.

FIG. 11 is a block diagram showing a connection between LANs such as an ATM switch or a bridge to which the dc power unit of the present invention is applied.

In FIG. 11, a numeral 1 denotes an ac input. A numeral 16 denotes an input switch. A numeral 42 denotes a protecting circuit for protecting a power unit circuit from failure resulting from an abrupt high voltage caused by a lightning strike or high current caused by short circuit. The protecting circuit 42 is composed of a fuse 43, a surge circuit 44 and a noise reducing filter 45. The ac input passes through the protecting circuit and then is applied to the dc power unit circuit 55. The input ac voltage is converted into a dc voltage through an ac-to-dc converter 41 containing one of various circuits (18 to 22) for coping with the harmonics. The dc voltage is converted into another dc voltage such as 5 volts, 0 volt, 12 volts and −12 volts through the effect of the dc-to-dc converter 8. The converted dc voltage is fed to a platter 49 through a counter flow preventing circuit 46. The platter is connected to a logic board 50 which mounts logic LSI chips 55 having various functions such as data transfer of the connecting unit between the LANs. An output of 5 volts is applied to a power layer of the logic board 50 and is used for transferring signals of the logic LSI chips.

An output of 12 volts is connected to a logic fan 51 for cooling down the logic LSI chip, a panel 53 for displaying and outputting a logical operated result, and a power fan 52 for cooling down the power unit 47 itself so that those components are allowed to be driven. In addition, the platter 49 provides a rush current preventing board for suppressing rush current when the logic board 50 is pluged in or out from the platter 49.

In this embodiment, the power unit arranged to cope with the harmonics offers various kinds of information processing apparatuses such as a highly reliable connecting unit without having to bring about a malfunction resulting from the abrupt change of voltage.

The invention of the present inventors has been concretely described along the embodiments of the invention. In actual, however, it goes without saying that the present invention is not limited to the foregoing embodiments and may be modified to various configurations without having to depart from the spirit of the invention.

For example, the first to the fourth control circuits are not limited to the illustrated ones of the foregoing embodiments. In place, they may be any component if it may delay the start of the converter at the later stage or control the connection by sensing the voltage of the boosting converter at the first stage or the delaying operation.

According to the present invention, the dc power unit composed of the first and the second converters provides an effect of preventing a malfunction of the second converter resulting from the variation of the output voltage from the first to the second converters and thereby improving the reliability of the operation.

Further, without causing the malfunction, the combination of the first and the second converters makes it possible to have an effect of realizing a wide-range continuous variable output power unit which can keep the optimal effect of suppressing the harmonics.

What is claimed is:

1. A dc power unit comprising:
   a first converter for converting an ac power into a dc power;
   a second converter for receiving the dc power of said first converter and converting said dc power into another dc power; and
   a first control circuit for starting said second converter later than the start of said first converter by a predetermined time.

2. A dc power unit as claimed in claim 1, wherein said first control circuit includes a circuit for sensing a level of the dc output voltage of said first converter and a circuit for starting said second converter when said dc output voltage level reaches a predetermined level.

3. A dc power unit as claimed in claim 1, wherein said first control circuit includes a circuit for sensing the dc output voltage value of said first converter and a circuit for connecting said first converter to said second converter and feeding said dc output voltage to said second converter.

4. A dc power unit as claimed in claim 1, wherein said first control circuit includes a voltage doubler rectifying circuit connected to an ac input applied to said first converter and a switch for switching connection between said ac power unit and said voltage doubler rectifying circuit, and said voltage doubler rectifying circuit is served to feed an output to a dc input of said second converter by closing said switch when the ac input voltage from said ac power unit is less than or equal to a predetermined value.

5. A dc power unit as claimed in claim 2, wherein said sensing circuit includes a voltage dividing resistor and a shunt regulator.

6. A dc power unit as claimed in claim 5, wherein said start circuit is a photocoupler.

7. A dc power unit as claimed in claim 3, wherein said feeding circuit is a switch to be closed when said sensing circuit senses a predetermined voltage.

8. A dc power unit as claimed in claim 7, wherein said sensing circuit is a Zener diode and said feeding circuit is a switch to be closed according to the output of said Zener diode.

9. An information processing apparatus comprising:
a first converter for converting an ac power into a dc power;
a second converter for receiving the dc power output of said first converter and converting said dc power output into another dc power;
a first control circuit for starting said second converter later than the start of said first converter by a predetermined time;
a platter connected to the power unit of said second converter; and
a logic board connected to said platter and having a logic LSI chip mounted to have as a driving power source a voltage output from said second converter.

10. An information processing apparatus as claimed in claim 9 further comprising:
a third converter for receiving the dc power output of said first converter and converting said dc power into another dc power;
a first cooling fan for cooling said logic board driven by the output of said third converter received through said platter; and
said first control circuit served to start said third converter later than the start of said first converter by a predetermined time.

11. An information processing apparatus as claimed in claim 9, wherein two or more electric power units are provided, each of said power unit includes said first and second converters and said first control circuit, and the outputs of said two or more electric power units are connected in parallel and with said platter.

12. An information processing apparatus as claimed in claim 11 further comprising a counter flow preventing circuit for preventing a counter flow of current to the output side of said second converter included in said power unit.

13. An information processing apparatus as claimed in claim 9, wherein said logic board has a logic LSI chip mounted for connecting LANs with each other.

14. An information processing apparatus as claimed in claim 9, wherein said first control circuit includes a circuit for sensing a dc output voltage level of said first converter and a circuit for starting said second converter when said dc output voltage level reaches a predetermined level.

15. An information processing apparatus as claimed in claim 13, wherein said sensing circuit includes a voltage dividing resistor and a shunt regulator.

16. An information processing apparatus as claimed in claim 14, wherein said starting circuit is a photocoupler.

17. A power control method executed in a dc power unit including a first converter for converting an ac electric power into a dc electric power and a second converter for receiving the dc output of said first converter and converting said dc output into another dc electric power, said method comprising the steps of:
starting said first converter; and
starting said second converter when the output voltage of said first converter reaches a predetermined value.

18. A power control method executed in a dc power unit including a first converter for converting an ac electric power into a dc electric power and a second converter for receiving the dc output of said first converter and converting it into another dc electric power, said method comprising the steps of:
starting said first converter; and
conveying the output of said first converter into said second converter when the output voltage of said first converter reaches a predetermined value.

19. A dc power unit comprising:
a rectifier for receiving ac power and outputting rectified dc power;
a first converter for receiving the rectified dc power from the rectifier and outputting first converted dc power;
a second converter for receiving the first converted dc power from the first converter and outputting second converted dc power; and
a control circuit for preventing the second converter from beginning to operate until a predetermined time has elapsed since a time at which the first converter began to operate.

* * * * *